United States Patent
Chang et al.

(10) Patent No.: US 7,908,468 B2
(45) Date of Patent: Mar. 15, 2011

(54) METHOD AND CONTROL CIRCUIT FOR REDUCING INSTANTANEOUS STARTUP CURRENT OF A COMPUTER SYSTEM

(75) Inventors: Chao-Huang Chang, Taipei (TW); Min-Tsung Huang, Taipei (TW)

(73) Assignee: Inventec Corporation, Taipei (TW)

( * ) Notice: Subject to any disclaimer, the term of this patent is extended or adjusted under 35 U.S.C. 154(b) by 700 days.

(21) Appl. No.: 11/934,544

(22) Filed: Nov. 2, 2007

(65) Prior Publication Data

US 2008/0072089 A1    Mar. 20, 2008

Related U.S. Application Data

(63) Continuation-in-part of application No. 11/395,971, filed on Mar. 30, 2006, now Pat. No. 7,356,386.

(30) Foreign Application Priority Data

Nov. 16, 2005 (TW) .............................. 94140209 A

(51) Int. Cl.
*G06F 9/24* (2006.01)
(52) U.S. Cl. .................................. 713/1; 713/2
(58) Field of Classification Search .................. 713/1, 2, 713/100
See application file for complete search history.

(56) References Cited

U.S. PATENT DOCUMENTS

| | | | | |
|---|---|---|---|---|
| 2003/0120394 A1* | 6/2003 | Ziarnik | ........................ | 700/300 |
| 2003/0193307 A1* | 10/2003 | Burstein | ....................... | 318/473 |
| 2005/0168929 A1* | 8/2005 | Inoue et al. | ................... | 361/683 |
| 2006/0178786 A1* | 8/2006 | Bhagwath et al. | ............ | 700/300 |
| 2007/0292257 A1* | 12/2007 | Ooi et al. | .......................... | 415/1 |

* cited by examiner

*Primary Examiner* — Mark Connolly
*Assistant Examiner* — Paul B Yanchus, III
(74) *Attorney, Agent, or Firm* — J.C. Patents

(57) ABSTRACT

A method and a control circuit for reducing an instantaneous startup current of a computer system by decreasing a fan rotational speed are provided. The computer system comprises a management controller coupled to a fan device through a tri-state buffer. In the present method, a duty cycle of a first PWM signal is reduced by the management controller. After that, the tri-state buffer is enabled to pass the first PWM signal with the reduced duty cycle to the fan device. Finally, the fan device is powered with the first PWM signal when the computer system is powered on. By reducing the duty cycle of the PWM signal before powering the computer system and turning on the fan device, the fan rotational speed of the fan device can be decreased when the computer system is powered on. As a result, the instantaneous startup current of the computer system can be reduced.

20 Claims, 2 Drawing Sheets

METHOD AND CONTROL CIRCUIT FOR REDUCING INSTANTANEOUS STARTUP CURRENT OF A COMPUTER SYSTEM

CROSS-REFERENCE TO RELATED APPLICATION

This application is a continuation-in-part of a prior application Ser. No. 11/395,971, filed Mar. 30, 2006. The prior application Ser. No. 11/395,971 claims the priority benefit of Taiwan application serial no. 94140209, filed on Nov. 16, 2005. The entirety of each of the above-mentioned patent applications is hereby incorporated by reference herein and made a part of this specification.

BACKGROUND OF THE INVENTION

1. Field of the Invention

The present invention relates to a method and a control circuit for reducing an instantaneous startup current of a computer system. More particularly, the present invention relates to a method and a control circuit for reducing the instantaneous startup current of the computer system by decreasing a rotational speed of a fan device connected to the computer system.

2. Description of Related Art

Generally speaking, the amount of processors is varied in computer systems according to its usage and purpose. For instance, 1 to 2 processors are enough for the operation of a personal computer (PC), but it may need 8 to 16 processors for a computer server with more functionalities. Furthermore, a super computer which is used for specialized purposes such as nuclear weapon simulation, metrological applications, or gene engineering, may need hundreds or even thousands processors to satisfy the requirement of high computation efficiency. However, an enormous amount of heat will be generated by hundreds and millions of transistors in the processors during operating the computer system. And the stability of the computer system will be affected if the thermal issue is ignored. As a result, in order to protect components in the computer system, the generated heat must be sank properly.

A fan device which contains a number of fans is a crucial part to solve the thermal issue in today's computer system. The fan device can effectively lower internal temperature of the computer system and is relatively cheap to make. Along with the Hi-speed device and compact system evolvement, thermal issue becomes more and more critical to the stability of the computer system. The corresponding solution is to increase the speed or amount of fans. But in doing so, it makes the acoustic and instantaneous startup current issue even worse.

In conventional implementation, a PWM signal is used for controlling the fan device. Basically speaking, when the computer system is powered on, all of fans comprised in the fan device will be turned on at the same time with the fall speed. It is not only incurs a big surge current at a very short timeframe causing system unstable and even reset, but also cause a intolerable heavily acoustic issue.

SUMMARY OF THE INVENTION

Accordingly, the present invention is directed to a method for reducing an instantaneous startup current of a computer system. The method reduces a duty cycle of a pulse width modulation (PWM) signal before powering the computer system and a fan device connected to the computer system. Thereafter, a fan rotational speed of the fan device can be lessened during the computer system is powered on, so as to decrease the instantaneous startup current.

The present invention provides a control circuit suitable for reducing an instantaneous startup current of a computer system which is connected with a fan device. The control circuit not only decreases the instantaneous startup current but also diminishes the operating noise of the fan device.

The present invention is directed to a method for reducing an instantaneous startup current of a computer system by decreasing a fan rotational speed. Wherein the computer system comprises a management controller coupled to a fan device through a tri-state buffer. In the method, a duty cycle of a first PWM signal is reduced by the management controller. After that, the tri-state buffer is enabled to pass the first PWM signal to the fan device. Finally, the fan device is powered with the first PWM signal when the computer system is powered on.

According to an embodiment of the present invention, before the step of reducing the duty cycle of the first PWM signal, the management controller is initiated by a standby power of the computer system.

According to an embodiment of the present invention, wherein the step of reducing the duty cycle of the first PWM signal comprises adjusting the duty cycle to 50%.

According to an embodiment of the present invention, wherein the step of enabling the tri-state buffer to pass the first PWM signal to the fan device comprises sending a first type control signal to the tri-state buffer by the management controller to enable the tri-state buffer to pass the first PWM signal to the fan device.

According to an embodiment of the present invention, a second type control signal is sent to the tri-state buffer by the management controller, so as to inhibit the tri-state buffer to pass the first PWM signal to the fan device.

According to an embodiment of the present invention, after the computer system is powered on, the tri-state buffer is enabled to pass a second PWM signal to the fan device by a backup controller of the computer system before a hardware initialization is performed. And the fan device is powered with the second PWM signal. Wherein the hardware initialization is a memory initialization. And the backup controller is a south bridge chipset or a super I/O chipset.

According to an embodiment of the present invention, wherein the step of enabling the tri-state buffer to pass the second PWM signal to the fan device comprises sending a first type control signal to the tri-state buffer by the backup controller to enable the tri-state buffer to pass the second PWM signal to the fan device.

According to an embodiment of the present invention, wherein the management controller comprises a baseboard management controller (BMC).

From another point of view, the present invention provides a control circuit for reducing an instantaneous startup current of a computer system by decreasing a fan rotational speed. The control circuit comprises a management controller and a tri-state buffer. Wherein a management controller comprises a first signal output port and a second signal output port, and is suitable for reducing a duty cycle of a first PWM signal. The tri-state buffer comprises an input terminal, a control terminal and an output terminal, wherein the input terminal coupled to the first signal output port, the control terminal coupled to the second signal output port, and the output terminal coupled to a fan device. The management controller enables the tri-state buffer to pass the first PWM signal to the fan device so as to power the fan device with the first PWM signal when the computer system is powered on.

According to an embodiment of the present invention, the first signal output port and the second signal output port are respectively coupling to two pull-up resistors, wherein each of the pull-up resistors is used for providing a high voltage level. And the output terminal of the tri-state buffer is coupling to a pull-down resistor to prevent the fan device form being powered during the output terminal remains in a floating state.

According to an embodiment of the present invention, wherein the management controller adjusts the duty cycle to 50%.

According to an embodiment of the present invention, the management controller sends a first type control signal to the tri-state buffer through the second signal output port to enable the tri-state buffer to pass the first PWM signal to the fan device. Besides, the management controller sends a second type control signal to the tri-state buffer through the second signal output port to inhibit the tri-state buffer to pass the first PWM signal to the fan device.

According to an embodiment of the present invention, the control circuit further comprises a backup controller. The backup controller comprises a third signal output port which is connected to the second signal output port of the management controller by a Wire-AND gate. The backup controller enables the tri-state buffer to pass a second PWM signal to the fan device before a hardware initialization is performed on the computer system, so as to power the fan device with the second PWM signal. Wherein the hardware initialization is a memory initialization, and the backup controller is a south bridge chipset or a super I/O chipset.

According to an embodiment of the present invention, the backup controller sends a first type control signal to the tri-state buffer through the third signal output port to enable the tri-state buffer to pass the second PWM signal to the fan device.

According to an embodiment of the present invention, the management controller is a BMC, and the tri-state buffer is a 74LCX125 buffer.

In the present invention, the duty cycle of the PWM signal is reduced in advance before the computer system and the fan device is powered on. By powering the fan device according to the PWM signal with the shorter duty cycle, the fan rotational speed of the fan device can be decreased when the computer system is powered on. Consequently, the instantaneous startup current of the computer system can be reduced.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
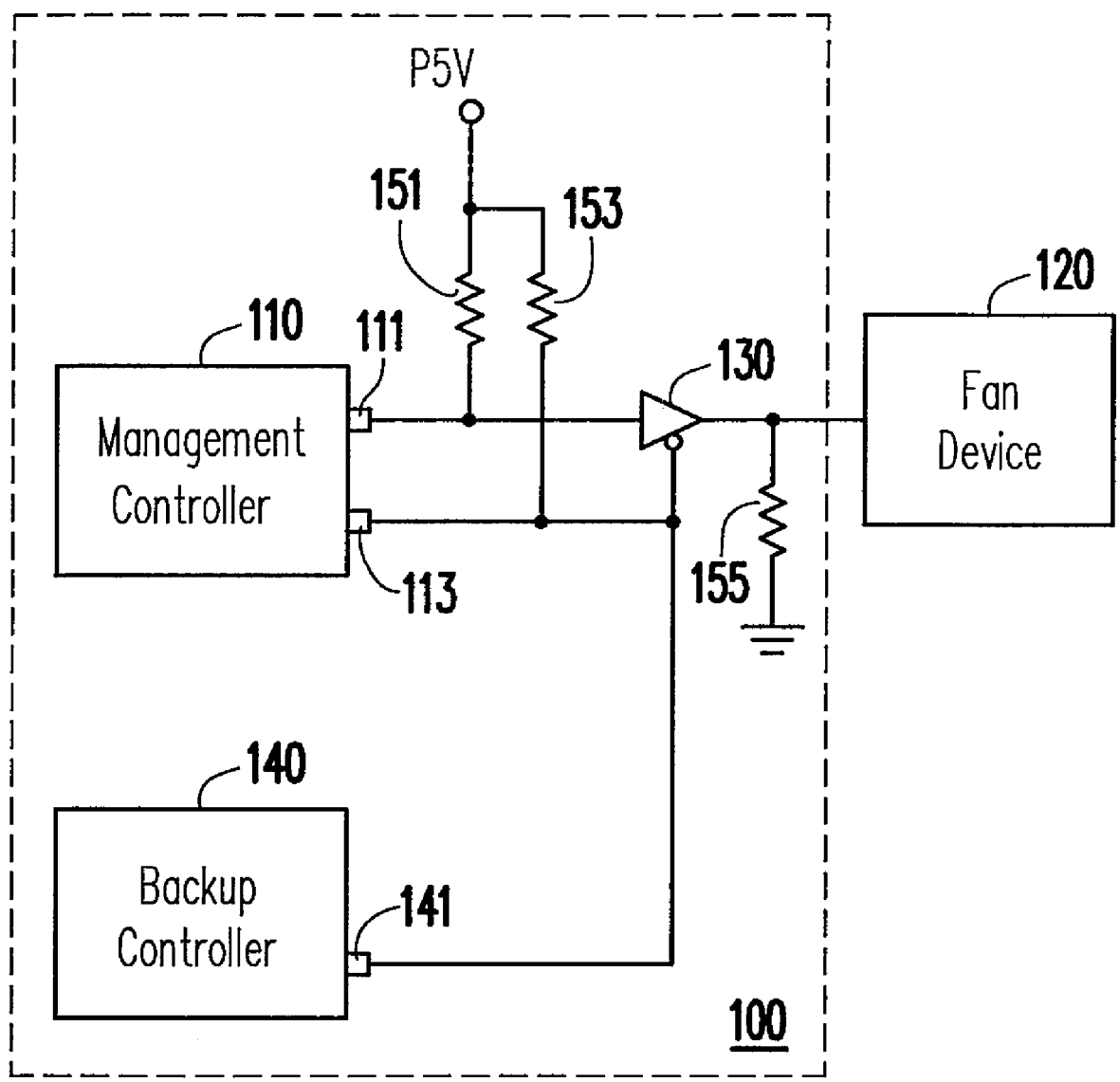
FIG. 1 is a circuit diagram of a control circuit for reducing an instantaneous startup current of a computer system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a circuit diagram of a control circuit for reducing an instantaneous startup current of a computer system according to an embodiment of the present invention. Referring to FIG. 1, the control circuit 100 comprising a management controller 110, a tri-state buffer 130 and a backup controller 140 is embedded in the computer system (not shown). A fan device 120 comprising at least one fan (not shown) is connected to the computer system through the tri-state buffer 130 and the management controller 110, and is used for solving the thermal issue of the computer system.

In this embodiment, the management controller 110 is, for example, the baseboard management controller (BMC) of the computer system. The management controller 110 is used for reducing a duty cycle of a first pulse width modulation (PWM) signal which affects a rotational speed of the fan device 120. A first signal output port 111 of the management controller 110 is suitable for passing the first PWM signal to the fan device 120 through the tri-state buffer 130, and a second signal output port 113 (e.g. a GPIO port) of the management controller 110 is used for outputting a control signal to the tri-state buffer 130. The default output signal of the second signal output port 113 is, for example, a signal in a high voltage level.

The tri-state buffer 130 comprises an input terminal, a control terminal and an output terminal. In this embodiment, the input terminal of the tri-state buffer 130 couples to the first signal output port 111, the control terminal of the tri-state buffer 130 couples to the second signal output port 113, and the output terminal of the tri-state buffer 130 couples to the fan device 120. It should be noted that, every signal received by the control terminal is used for controlling the tri-state buffer 130 to pass or not to pass the signal received by the input terminal to the output terminal.

According to the buffer fabrication, the input and output voltage tolerant of the tri-state buffer 130 are predefined. For example, if the tri-state buffer 130 is a 74LCX125 buffer with 5V tolerant input and output in this embodiment, input signals to the tri-state buffer 130 should be pulled up to 5V. Consequently, a pull-up resistor 151 and a pull-up resistor 153 are connected to the first signal output port 111 and the second signal output port 113 respectively to provide the high voltage level. On the other hand, to prevent the fan device 120 form being powered during the output terminal of the tri-state buffer 130 remains in a floating state, a pull-down resistor 155 to ground is connected to the output terminal of the tri-state buffer 130.

In this embodiment, not only the management controller 110 but also the backup controller 140 can transmit PWM signals to the fan device 120 through the tri-state buffer 130. The backup controller 140 is, for example, a south bridge chipset or a super I/O chipset of the computer system which comprises a third signal output port 141 (e.g. a GPIO port), and the default output signal of the third signal output port 141 is a signal with high voltage level. In this embodiment, the third signal output port 141 is connected to the second signal output port 113 of the management controller 110 by a Wire-AND gate (not shown). That is, as long as one of the output signals of the second signal output port 113 or the third signal output port 141 is in the low voltage level, the tri-state buffer 130 will be enabled to pass the signal from the input terminal to the output terminal.

Figure 2:
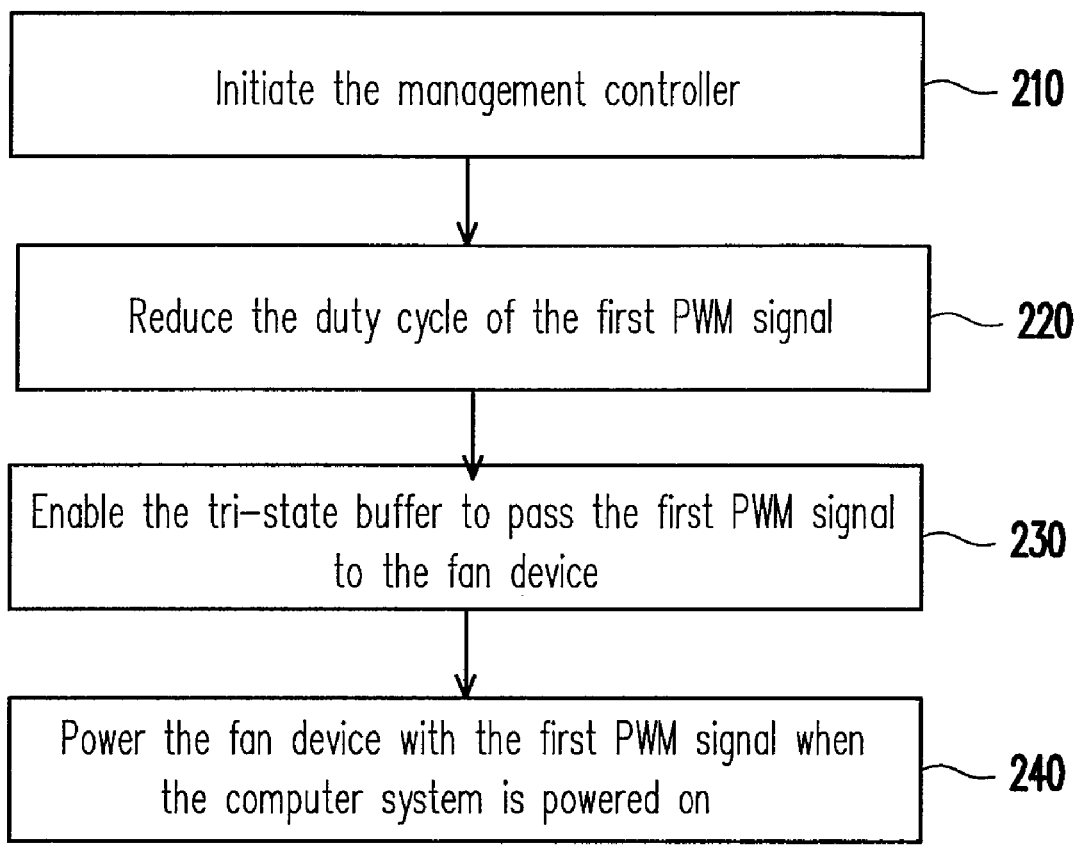
FIG. 2 is a flow chart of a method for reducing the instantaneous startup current of the computer system according to the embodiment of the present invention.

In order to illustrate how the control circuit 100 reduces the instantaneous startup current of the computer system, the following embodiment is provided to further illustrate the present invention in details. FIG. 2 is a flow chart of a method for reducing the instantaneous startup current of the computer system according to the embodiment of the present invention. Referring to both FIG. 1 and FIG. 2, assuming that the management controller 110 is BMC and can be initiated by the standby power of the computer system. In step 210, the initialization of the management controller 110 is performed after an AC power source is connected to the computer system.

Figure 3:
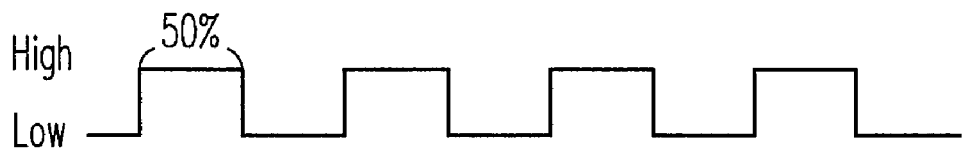
FIG. 3 is a diagram of the first PWM signal with 50% duty cycle.

In this embodiment, assuming that the first PWM signal is in the high voltage level by default, that is, the duty cycle is 100%. In step 220, after the management controller 110 is initiated, the duty cycle of the first PWM signal can be reduced by the management controller 110. For instance, the management controller 110 adjusts the duty cycle of the first PWM signal to 50%. The first PWM signal with 50% duty cycle is shown in FIG. 3. Referring to FIG. 3, the first PWM signal is in high voltage level for 50% of the period and in low voltage level for other 50%. It should be noted that, the 50% duty cycle is an example of the present invention, but is not limited herein.

It should be noted about that, since both of the default output signals of the second signal output port 113 and the third signal output port 141 are in the high voltage level, the tri-state buffer 130 is inhibited to pass the first PWM signal to the fan device 120 before the modification on the first PWM signal has been finished. In the other word, the management controller 110 continuously sends a second type control signal (e.g. a signal in the high voltage level) to the control terminal of the tri-state buffer 130 through the second signal output port 113 before the modification on the first PWM signal has been finished.

However, as shown in step 230, after the modification of the first PWM signal is completed by the management controller 110, the management controller 110 sends a first type control signal (e.g. a signal in the low voltage level) to the control terminal of the tri-state buffer 130 through the second signal output port 113. As a result, the tri-state buffer 130 is enabled to pass the first PWM signal with 50% duty cycle to the fan device 120.

In step 240, when the computer system is powered on, the fan device 120 is powered by the received first PWM signal with 50% duty cycle. Since the duty cycle of the first PWM signal is diminished to 50%, the rotational speed of the fan device 120 will be decreased to half speed. Consequently, when powering the computer system, the instantaneous startup current caused by powering the fan device 120 can be reduced.

It is worth to mention about that, to prevent the crash on the management controller 110, either the management controller 110 or the backup controller 140 can control the tri-state buffer 130 to pass PWM signals. In one embodiment, it is assumed that the management controller 110 is broken so that the management controller 110 can neither modifies a PWM signal nor controls the tri-state buffer 130 to pass the PWM signal to the fan device 120. In this situation, after the computer system is powered on, the output of the third signal output port 141 is changed from high voltage level (that is, its default output signal) to low voltage level by the BIOS code before performing a hardware initialization (e.g. a memory initialization) on the computer system. Thereupon the backup controller 140 sends the control signal with low voltage level to the control terminal of the tri-state buffer 130 through the third signal output port 141. By receiving the control signal with low voltage level, the tri-state buffer 130 is enabled to pass signal from the input terminal to the output terminal, thus a second PWM signal (e.g. the signal with high voltage level provided by the 5 v power source) will be directly pass to the fan device 120, and the fan device 120 is powered with full speed. In this embodiment, the fan device 120 can still work even though the management controller 110 is broken.

In view of the above, the present invention provides a method and a control circuit to minimize an instantaneous startup current of a computer system. According to the above embodiments, the present invention at least includes the following advantages:

1. By reducing the duty cycle of the PWM signal before powering the computer system, the fan device can be powered by the PWM signal with a shorter duty cycle. As a result, the rotational speed of the fan device is decreased, and the instantaneous startup current cause by powering the fan device during powering the computer system can also be reduced. For this reason, the stability of the computer system can be kept.

2. Since the rotational speed of the fan device is decreased, the noise of the fan device can be diminished so that the user can use the computer system more comfortably.

3. Both of the management controller and the backup controller are used for determining whether or not passing PWM signals to the fan device. Therefore, after powering on the computer system, the fan device can always work even if the management controller is broken.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for reducing an instantaneous startup current of a computer system by decreasing a fan rotational speed, wherein the computer system comprises a management controller coupled to a fan device through a tri-state buffer, the method comprising:

reducing a duty cycle of a first pulse width modulation (PWM) signal by the management controller;

enabling the tri-state buffer to pass the first PWM signal to the fan device;

powering the fan device with the first PWM signal when the computer system is powered on;

after the computer system is powered on, enabling the tri-state buffer to pass a second PWM signal to the fan device by a backup controller of the computer system before performing a hardware initialization; and powering the fan device with the second PWM signal.

2. The method as claimed in claim 1, wherein, before the step of reducing the duty cycle of the first PWM signal, further comprising:

initiating the management controller by a standby power of the computer system.

3. The method as claimed in claim 1, wherein the step of reducing the duty cycle of the first PWM signal comprises:

adjusting the duty cycle to 50%.

4. The method as claimed in claim 1, wherein the step of enabling the tri-state buffer to pass the first PWM signal to the fan device comprises:

sending a first type control signal to the tri-state buffer by the management controller to enable the tri-state buffer to pass the first PWM signal to the fan device.

5. The method as claimed in claim 1, further comprising:
sending a second type control signal to the tri-state buffer by the management controller to inhibit the tri-state buffer to pass the first PWM signal to the fan device.

6. The method as claimed in claim 1, wherein the step of enabling the tri-state buffer to pass the second PWM signal to the fan device comprises:
sending a first type control signal to the tri-state buffer by the backup controller to enable the tri-state buffer to pass the second PWM signal to the fan device.

7. The method as claimed in claim 1, wherein the hardware initialization comprises a memory initialization.

8. The method as claimed in claim 1, wherein the backup controller comprises a south bridge chipset or a super I/O chipset.

9. The method as claimed in claim 1, wherein the management controller comprises a baseboard management controller (BMC).

10. A control circuit for reducing an instantaneous startup current of a computer system by decreasing a fan rotational speed, the control circuit comprising:
a management controller, comprising a first signal output port and a second signal output port, suitable for reducing a duty cycle of a first PWM signal; a tri-state buffer, comprising an input terminal, a control terminal and an output terminal,
wherein the input terminal coupled to the first signal output port, the control terminal coupled to the second signal output port, and the output terminal coupled to a fan device,
wherein the management controller enables the tri-state buffer to pass the first PWM signal with the reduced duty cycle to the fan device so as to power the fan device when the computer system is powered on; and
a backup controller, comprising a third signal output port which is connected to the second signal output port of the management controller by a Wire-AND gate, wherein the backup controller enables the tri-state buffer to pass a second PWM signal to the fan device before a hardware initialization is performed on the computer system, so as to power the fan device with the second PWM signal.

11. The control circuit as claimed in claim 10, wherein the first signal output port and the second signal output port respectively couple to two pull-up resistors, wherein each of the pull-up resistors is used for providing a high voltage level.

12. The control circuit as claimed in claim 10, wherein the output terminal of the tri-state buffer couples to a pull-down resistor to prevent the fan device from being powered while the output terminal remains in a floating state.

13. The control circuit as claimed in claim 10, wherein the management controller adjusts the duty cycle to 50%.

14. The control circuit as claimed in claim 10, wherein the management controller sends a first type control signal to the tri-state buffer through the second signal output port to enable the tri-state buffer to pass the first PWM signal to the fan device.

15. The control circuit as claimed in claim 10, wherein the management controller sends a second type control signal to the tri-state buffer through the second signal output port to inhibit the tri-state buffer to pass the first PWM signal to the fan device.

16. The control circuit as claimed in claim 10, wherein the backup controller sends a first type control signal to the tri-state buffer through the third signal output port to enable the tri-state buffer to pass the second PWM signal to the fan device.

17. The control circuit as claimed in claim 10, wherein the hardware initialization comprises a memory initialization.

18. The control circuit as claimed in claim 10, wherein the backup controller comprises a south bridge chipset or a super I/O chipset.

19. The control circuit as claimed in claim 10, wherein the management controller comprises a BMC.

20. The control circuit as claimed in claim 10, wherein the tri-state buffer comprises a 74LCX125 buffer.

* * * * *